United States Patent [19]

Belforte et al.

[11] 4,009,349
[45] Feb. 22, 1977

[54] SWITCHING STATION FOR PCM TELECOMMUNICATION SYSTEM

[75] Inventors: Piero Belforte; Giovanni Perucca, both of Turin, Italy

[73] Assignee: CSELT - Centro Studi e Laboratori Telecomunicazioni SpA, Turin, Italy

[22] Filed: Sept. 4, 1975

[21] Appl. No.: 610,377

[30]  Foreign Application Priority Data

Sept. 4, 1974  Italy ............................ 69678/74

[52] U.S. Cl. .......................................... 179/15 AT
[51] Int. Cl.² ........................................ H04Q 11/04
[58] Field of Search ..... 179/15 AT, 15 AQ, 18 GF; 340/166 R; 307/243, 244

[56]  References Cited
UNITED STATES PATENTS

| | | | |
|---|---|---|---|
| 3,263,030 | 7/1966 | Stiefel | 179/15 AT |
| 3,458,659 | 7/1969 | Sternung | 179/15 AQ |
| 3,637,941 | 1/1972 | Rekiere | 179/15 AQ |
| 3,790,713 | 2/1974 | Neufang | 179/15 AT |

*Primary Examiner* — David L. Stewart
*Attorney, Agent, or Firm* — Karl F. Ross; Herbert Dubno

[57]  ABSTRACT

A switching station for a telecommunication system, operating with pulse-code modulation, serves a multiplicity of incoming and outgoing PCM channels each consisting of a succession of 8-bit words cyclically interleaved with the words of 31 other channels in an assigned time slot of a 32-channel frame, 32 such frames being received and transmitted over as many signal paths forming a frame group. There are $n$ incoming frame groups and $n$ outgoing frame groups with synchronized bit phases in all the spatially separated channels thereof. A central processor controls the concurrent storage of all the incoming bits of a given phase in $n$ pairs of 16-section input memories, each memory section consisting of 8 stages for the bits of a respective word from an incoming channel on a receiving signal path. During each time slot all the bits of each stored word are read out in parallel from the corresponding input-memory section into a similar section of an output memory from which they can be serially fed to a transmitting signal path during a period allocated to a selected outgoing channel. Thus, any incoming channel can communicate with any outgoing channel in the course of each frame.

6 Claims, 7 Drawing Figures

SWITCHING STATION FOR PCM TELECOMMUNICATION SYSTEM

FIELD OF THE INVENTION

Our present invention relates to a switching station for a telephone or other telecommunication system, operating with pulse-code modulation (PCM), designed to establish a connection between any two subscribers served by a central office or exchange of which such switching station forms part.

BACKGROUND OF THE INVENTION

In a PCM system each message channel, serving as an extension of an individual subscriber line, consists of a succession of multibit words (usually of eight bits each) which are interleaved with words of a certain number of other channels within a recurrent frame period. Each word represents a digitized sample of the instantaneous amplitude of a voice signal or the like. The time positions occupied by the words of the several interleaved channels are referred to as time slots, each of them being subdivided into $h$ bit periods which will be referred to hereinafter as phases. There are $p$ time slots per frame in the case here considered, $h = 8$ and $p = 32$. In telephone systems or the like, in which each subscriber line has an incoming and an outgoing branch, each subscriber line has an incoming and an outgoing channel allotted to it during communication.

Since intercommunicating subscribers have different time slots assigned to them, the exchange of information between them requires interim storage of words to be transferred from an incoming to an outgoing frame. Obviously, the complexity of the equipment needed for this purpose increases with the number of subscribers served by a given switching station.

OBJECTS OF THE INVENTION

The general object of our present invention, therefore, is to provide an improved switching station for the purpose set forth, affording unlimited access from any incoming to any outgoing channel, which is of relatively simple construction and accommodates a large number of channels.

A related object is to provide modular switching equipment which can be conveniently adapted to exchanges operating at full or less than full capacity.

SUMMARY OF THE INVENTION

In a system according to our present invention, the frames arriving at a switching station are spatially distributed over $n$ groups of $m$ signal paths each, each signal path carrying one recurrent frame consisting of $p$ time slots allocated to as many channels with $p$ preferably equal to $m$. A like grouping exists among the outgoing channels. The phases of all the frames arriving on the receiving signal paths are synchronized so that the first bit of the $k^{th}$ word of any frame coincides with the first bit of the $k^{th}$ word of any other frame, the same being true of course for all other homologous phases and time slots. During each bit phase, the signal paths of each group are scanned by a set of first multiplexers which deliver their homologous bits to corresponding stages of respective $h$-stage sections of an $m$-section input register associated with each group. At the end of each time slot, therefore, the register is occupied by all the bits of the words just received over the $m$ associated signal paths. In a terminal part of the last phase of the time slot, the contents of each section of every input memory are read out in parallel, with the aid of a second set of multiplexers controlled by a central processor, to an $h$-stage section of an $m$-section output memory assigned to a transmitting signal path in a group associated with the latter memory. During the time slot allotted to the desired outgoing channel, the word stored in that output-memory section is read out bit-by-bit to the associated signal path for transmission to its ultimate destination.

Advantageously, for modulator reasons discussed below, the groups of receiving signal paths are split into halves which are alternately scanned by the respective multiplexers and work into corresponding halves of the associated input memories. We also prefer to split each output memory into two pairs of submemories adapted to be loaded from respective input-memory halves via a similarly quartered transit memory. The two paired submemories of each output memory are alternately loaded and unloaded in respective time slots.

BRIEF DESCRIPTION OF THE DRAWING

The above and other features of our invention will now be described in detail with reference to the accompanying drawing in which.

SPECIFIC DESCRIPTION

Figure 1:
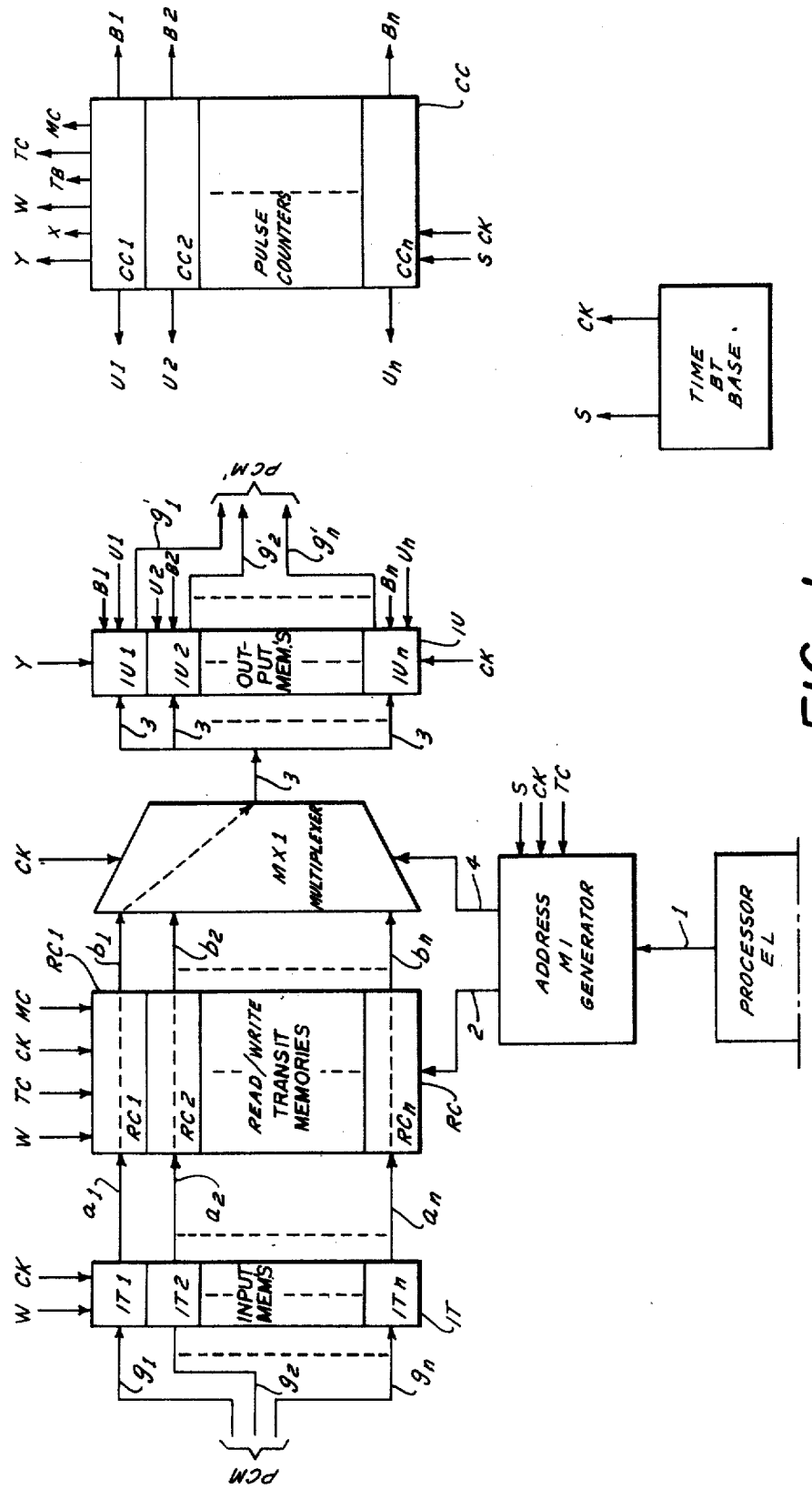
FIG. 1 is an overall block diagram of a PCM switching station embodying our invention.

In FIG. 1 we have shown the overall organization of a switching station embodying our invention, with a multiplicity of incoming channels PCM and outgoing channels PCM'. The incoming channels are distributed over $n$ groups $g_1 - g_n$ of receiving conductors; the outgoing channels are distributed over corresponding groups $g'_1 - g'_n$ of transmitting conductors. The conductors of each group terminate at a respective input memory IT1 – IT$n$ of a storage unit IT, described in greater detail hereinafter with reference to FIG. 2. The memories IT1 etc. of unit IT are connected via respective conductor multiples $a_1 - a_n$ to respective transit memories RC1 – RC$n$ of a storage unit RC, more fully described below with reference to FIG. 3. These latter memories work by way of multiples $b_1 - b_n$ into a conventional multiplexer MXI having an output multiple 3 connected in parallel to respective output memories IU1 – IU$n$ of a storage unit IU, described more fully hereinafter with reference to FIG. 4, the memories IU1 etc. serving the respective groups $g'_1 - g'_n$ of the transmitting conductors carrying the outgoing channels PCM'. All these memories are of the read/write type; the information stored therein is automatically erased upon the inscription of new data.

A central processor El operates in the conventional manner to monitor the establishment and termination of a connection of any calling subscriber with any called subscriber and to control the necessary switching operations. To processor works via a multiple 1 into an address generator MI whose output multiples 2 and 4 control the readout of incoming words from any transit memory of storage unit RC by way of multiplexer MX1 to a selected output register of storage unit IU. These operations are carried out in response to switching pulses S and clock pulses CK emitted by a time base BT, there being at least 32 clock pulses per bit phase in the system here specifically disclosed. A counting unit CC, more fully described below with reference to FIG. 5, responds to the pulses S and CK from time base BT to generate a variety of control signals W, TB, TC, MC, X,Y, Bl – B$n$ and Ul – U$n$ for the several storage units IT, RC and IU as explained in detail hereinbelow, the two last-mentioned sets of signals originating at respective subunits CC1, CC2, . . . CC$n$. Signals W, X, TB and TC encompass each a variety of pulses such as W1, X1, TB0 and TC3.

Figure 2:
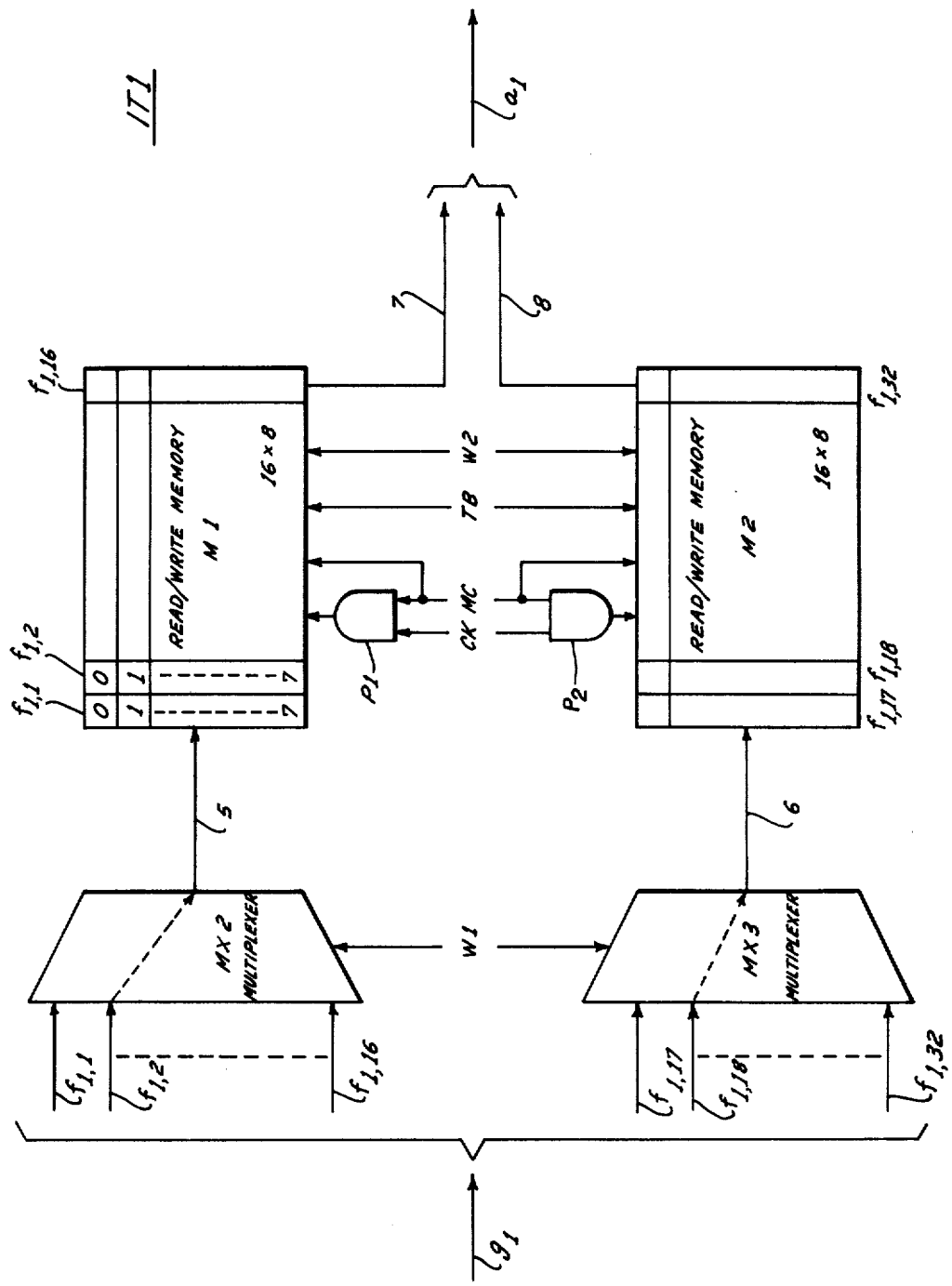
FIG. 2 is a detailed block diagram of an input memory forming part of the station of FIG. 1.
Figure 6:
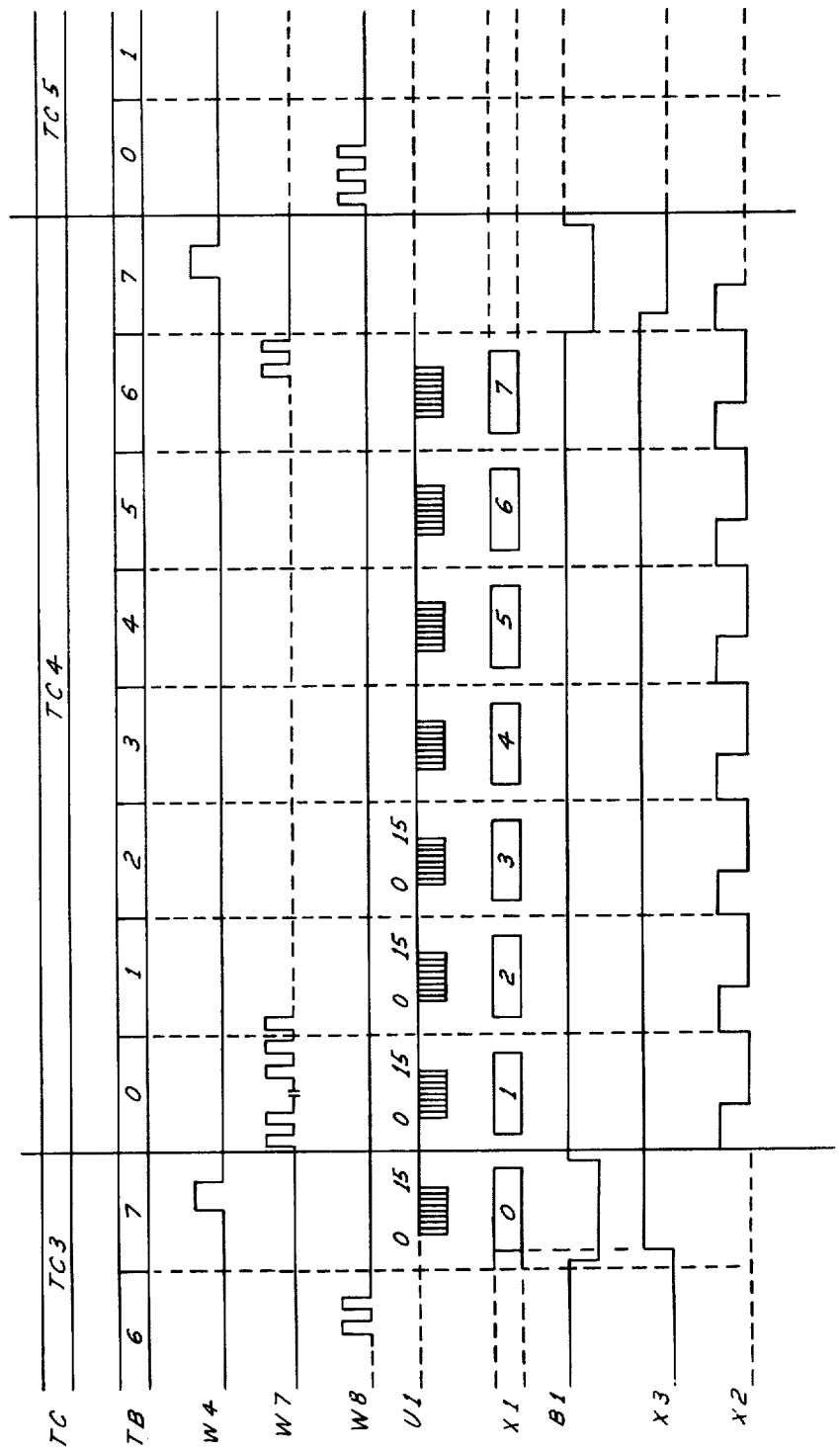
FIG. 6 is a set of graphs illustrating various signals generated in the course of a time slot.

Each memory of unit IT, as particularly illustrated in FIG. 2 for the first input memory IT1, is divided into two halves or submemories M1 and M2 to which the 32 conductors of the corresponding group (here $g_1$) are sequentially connectable by respective multiplexers MX2 and MX3 with output leads 5 and 6, under the control of pulses W1, with the first 16 conductors (for frames $f_{1,1} - f_{1,16}$) extendable to submemory M1 and the remaining conductors (for frames $f_{1,17} - f_{1,32}$) extendable to submemory M2. The loading of submemories M1 and M2 is controlled by a pair of AND gates P1, P2 with inputs receiving clock pulses CK and the writing pulse MC. This writing pulse also goes directly to the two submemories to block the reading thereof during the writing interval. Pulses TB are codes identifying the eight bit phases 0, 1, 2, . . . 7 of each time slot as illustrated in FIG. 6, several of these phases being shown at TB0, TB1 and TB7 in FIG. 7.

Each memory half M1 and M2 is divided into 16 sections, shown as vertical columns, labeled $f_{1,1}, f_{1,2}, \ldots f_{1,16}$ in submemory M1 and $f_{1,17}, f_{1,18}, \ldots f_{1,32}$ in submemory M2, in conformity with the frames whose bits are to be stored in these sections. Each memory section has eight stages, labeled 0, 1, . . . 7, for the respective bits of a word of the corresponding frame. The loading of homologous stages of all the sections of all the memories of unit IT occurs in the same bit phase, multiplexers MX2 and MX3 sequentially scanning their 16 conductors during each phase of a time slot to write the respective bits in the No. 0 stages of these memory sections during the first phase TB0, in the No. 1 stages thereof during the second phase TB1, and so on. At the end of each time slot, all the submemories of unit IT are completely loaded if the system operates at full capacity. It will be apparent that, thanks to the subdivision of each memory into two halves, the same equipment may be used in a switching station of only half that capacity by simply leaving idle the second half M2 of each memory in the several storage units IT, RC, IU.

Figure 7:
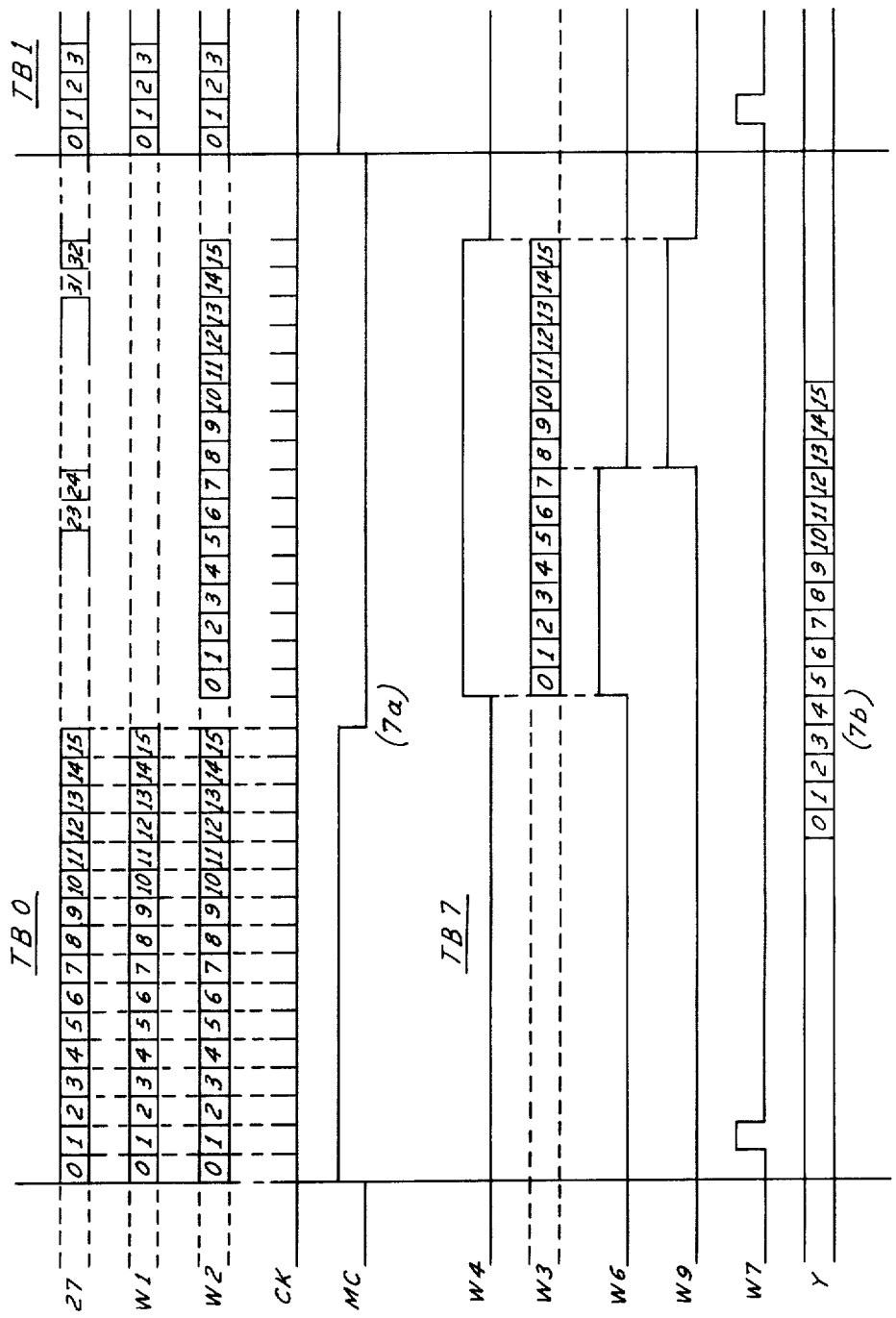
FIG. 7 consists of two sets of graphs, respectively labeled 7a and 7b, which illustrate the signal distribution during the first and the last bit phase of a time slot.

The whole writing process takes place in less than half a bit phase, as indicated by the length of signal MC in FIG. 7 where signal W1 is shown to supply the codes 0, 1, . . . 15 for the 16 conductors to be scanned by each multiplexer MX2, MX3 during that part of a phase. A signal W2 similarly marks the 16 pairs of memory sections $f_{1,1}/f_{1,17}, f_{1,2}/f_{1,18} \ldots f_{1,16}/f_{1,32}$ which are to be sequentially read, that signal being ineffectual in the presence of signal MC and becoming operative only in the second half of phase TB7 in the presence of reading pulse W2 as more fully discussed hereinafter. The readout takes place in parallel for all the bits of a word, stored in the several stages of memory section, via respective sets of conductors 7 and 8 constituting the multiple $a_1$. A reading command W4 comes into existence only in the second half of the last phase TB7 of a time slot as shown in the lower half 7$b$ of FIG. 7.

Figure 3:
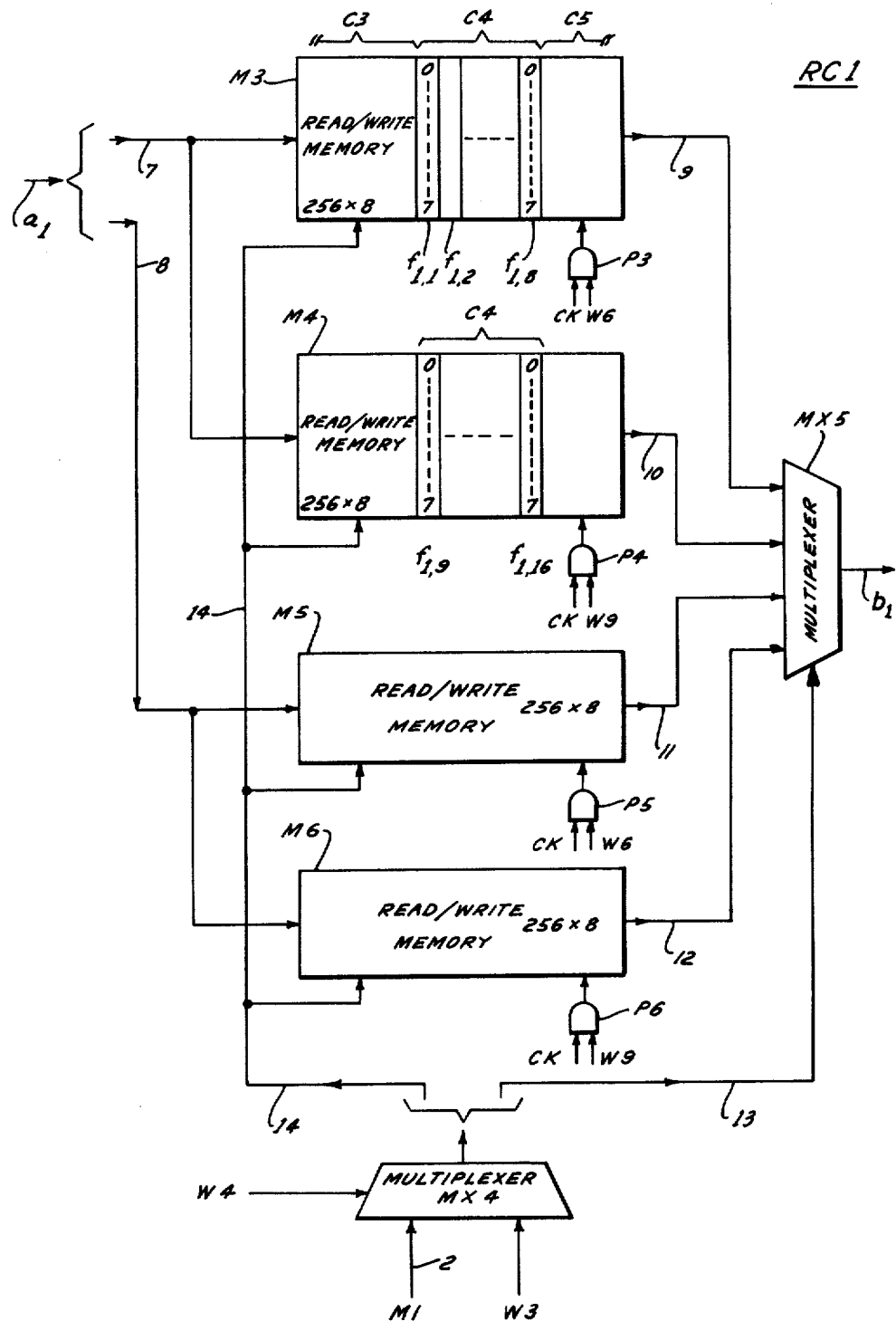
FIG. 3 is a detailed block diagram of a transit memory included in the station of FIG. 1.

In FIG. 3 we have shown details of storage unit RC, more particularly of the first transit memory RC1 thereof, receiving during each time slot the words read out via multiple $a_1$ from the associated input memory IT1. Memory RC1 is shown divided into four submemories M3, M4, M5 and M6. Each submemory consists of 32 subdivisions of eight sections each, these sections being again shown as vertical rows of eight stages. The several memory subdivisions are respectively allocated to the time slots C1, C2, . . . C32 of a frame period; only the subdivisions allocated to time slots C3, C4 and C5 have been specifically indicated. The first submemory M3 accommodates in each subdivision such as C4 respective words from the first 8 frames $f_{1,1}, f_{1,2}, \ldots f_{1,8}$ of the associated group $g_1$; the corresponding subdivision of the second submemory M4 receives the words of the next eight frames $f_{1,9} - f_{1,16}$, the remaining sixteen frames of the group being handled by submemories M5 and M6. Thus, leads 7 extend in parallel to submemories M3 and M4 whereas leads 8 terminate at submemories M5 and M6. Each submemory, accordingly, consists of 256 sections adapted to store eight bits per section, the contents of the sections of each subdivision being sequentially updated in a predetermined order during the corresponding time slot of each frame period.

A multiplexer MX4 receives address information from generator MI (FIG. 1) via multiple 2 and is controlled by reading signal W4 and section-identifying pulses W3 shown in FIG. 7. Read/write instructions are given to the several submemories in parallel by an output lead 14 of multiplexer MX4 whereas routing instructions are transmitted by that multiplexer to another multiplexer MX5 into which the words stored in the several sections of a submemory portion (e.g. C4) are read out via multiples 9, 10, 11 and 12. The reading is controlled by respective AND gates P3, P4, P5 and P6 receiving the clock pulses CK as well as enabling pulses W6 and W9, the latter unblocking the writing circuits of submemories M3 and M5 during the first half and those of submemories M4 and M6 during the second half of the period encompassed by reading signal W4 as will be apparent from FIG. 7.

In this way, the first eight words read out from memory section M1 (FIG. 2) in the presence of reading pulse W2 are inscribed in the corresponding subdivision of submemory M3 while the other eight words from submemory M1 are written into the homologous subdivision of submemory M4. By the same token, the sixteen words stored in submemory M2 are transferred partly to submemory M5 and partly to submemory M6. The readout of any words thus stored, under the control of switching information transmitted to multiplexer MX5 from address generator MI via leads 2, multiplexer MX4 and lead 13, takes place over multiple $b_1$ in the time slot assigned to the outgoing channel for which the message is destined.

Figure 4:
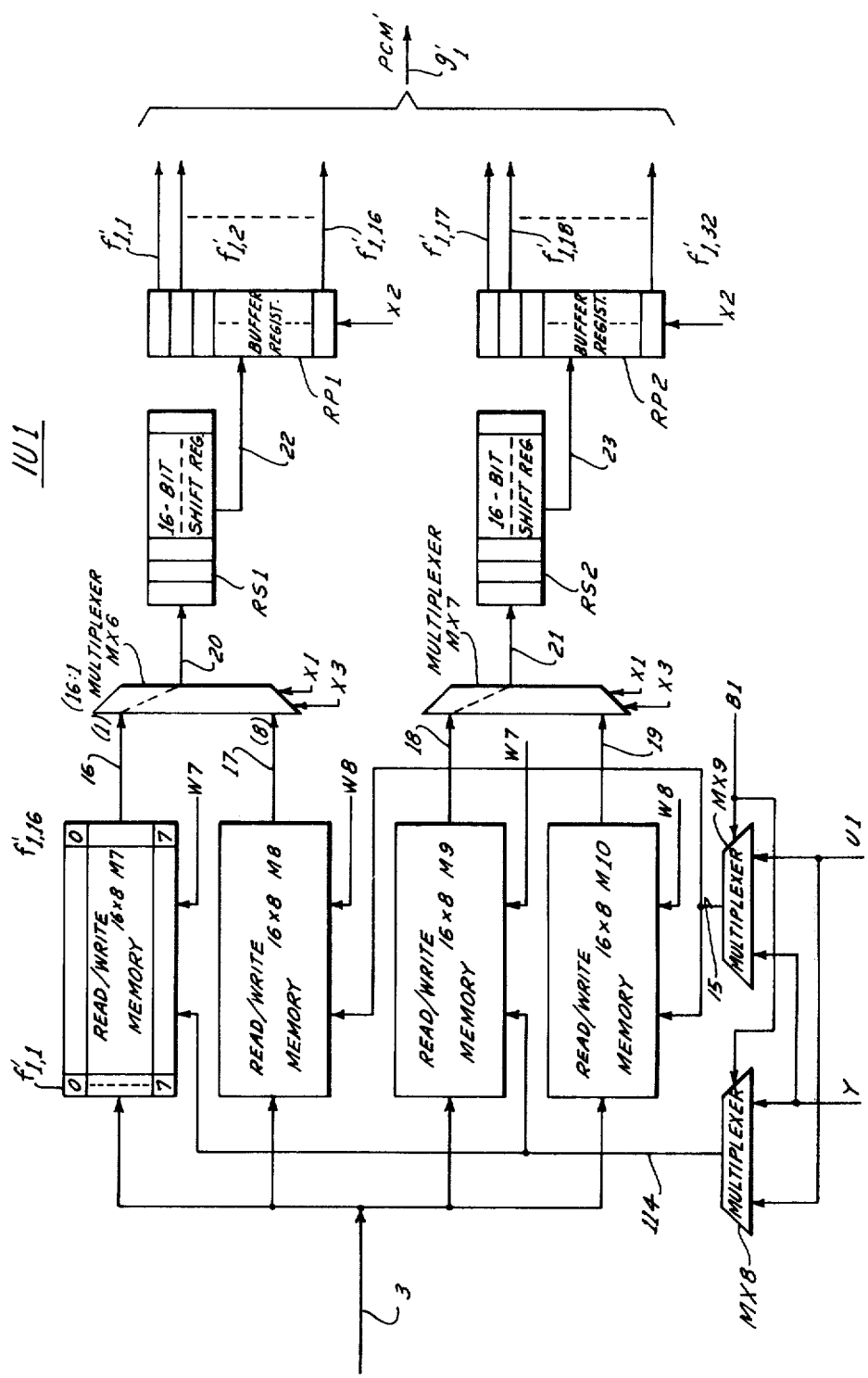
FIG. 4 is a detailed block diagram of an output memory and associated shift and buffer registers also forming part of that station.

Multiplexer MX1 (FIG. 1), also receiving the address information from generator MI by way of multiple 4, simultaneously feeds all the words read out in a given time slot to all the memories IU1 – IUn of storage unit IU, the first such memory IU1 being illustrated in FIG. 4 and being, of course, representative of all the other memories thereof. Memory IU1 is split into four submemories M7, M8, M9 and M10 each comprising sixteen 8-bit sections designated $f'_{1,1} - f'_{1,16}$ in the case of submemory M7. This designation conforms to that of the sixteen frames in that half of transmitting group $g'_1$ which co-operates with submemories M7 and M8, the connection between these two submemories and the conductors of group $g'_1$ including the multiplexer MX6 working via a lead 20 into a sixteen-bit shift register RS1 which is loaded in series via a lead 16, during each phase, with the several bits stored in corresponding stages of sections $f'_{1,1} - f'_{1,16}$ of this memory. The bits so stored are transferred, in parallel, to respective stages of a buffer register RP1 working into the conductors for outgoing frames $f'_{1,1}, f'_{1,2} \ldots f'_{1,16}$. In an analogous manner, the contents of submemory M8 are delivered via a lead 17, multiplexer MX6 and registers RS1, RP1 to the same transmitting conductors. The sixteen remaining conductors of group $g'_1$, corresponding to outgoing frames $f'_{1,17}, f'_{1,18} \ldots f'_{1,32}$, are energized in like manner from the contents of submemories M9 and M10 by way of leads 18 and 19, a multiplexer MX7 having an output lead 21, a sixteen-bit shift register RS2 with output multiple 23, and a buffer register RP2.

The writing and reading of memory IU1 is controlled by signals Y and U1 applied via a pair of multiplexers MX8, MX9, in response to a switching signal B1, to respective leads 114 and 15. Signal Y, occurring only in phase TB7 as shown in FIG. 7, is common to all the memories of storage unit IU and appears on leads 114 and 15 in alternate time slots. Signal U1, which sequentially addresses the several submemory sections as indicated in FIG. 6, appears on lead 15 if lead 114 carries the signal Y, and vice versa.

It will be noted that lead 114 extends to submemories M7 and M9 where lead 15 terminates at submemories M8 and M10. Writing and reading thus take place alternately in two pairs of submemories, under the respective control of pulses U1 and Y.

The inscription of the arriving words in the sections of memory IU1 is controlled by writing pulses W7 and W8 respectively enabling the associated pairs of submemories M7, M9 and M8, M10, in succession, during alternate time slots.

The sequential readout of the several submemories M7 - M10 via multiplexers MX6 and MX7 takes place under the control of a reading pulse X3 and a train of pulses X1 addressing the several stages 0 – 7 of each memory section. The beginning of pulse train x1 and of signal X3 coincides with the emission of signal B1 from the corresponding subdivision CC1 of counting unit CC, that signal alternately shifting the positions of multiplexers MX8 and MX9 between inputs Y and U1 as discussed above. The discharge of the transferred bits from buffer registers RP1 and RP2 is controlled by pulses X2. That discharge takes place in the time slots of the channels for which the transferred bits are intended; the readout of these bits into shift registers RS1 and RS2, however, must occur with a lead time of one phase. For this reason the first pulse X1, the switching signal B1 and the beginning of signal X3 occur already in the last phase (No. 7) of the immediately preceding time slot.

Figure 5:
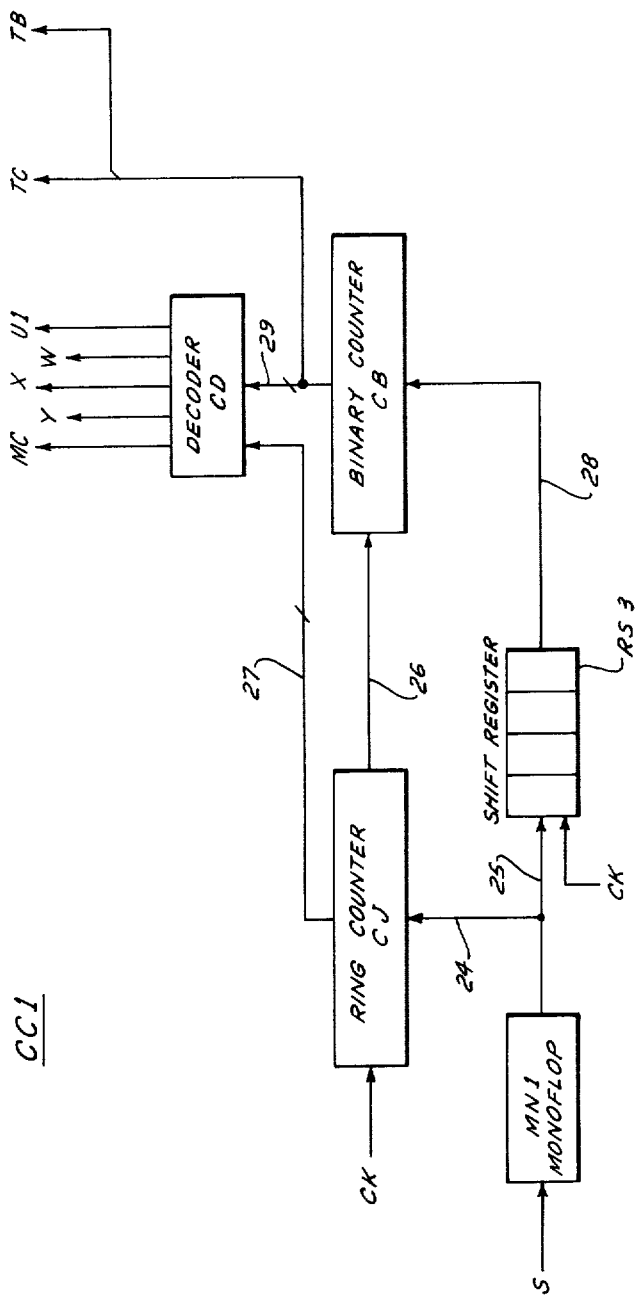
FIG. 5 is a detailed block diagram of a counting unit included in the station.

Reference will now be made to FIG. 5 which shows the subdivision CC1 of counting unit CC as comprising a monostable multivibrator or monoflop MN1 which is periodically tripped by the frame-synchronizing signal S from time base BT (FIG. 1). Monoflop MN1 generates on a lead 25 a pulse, of a width less than the recurrence period of clock signal CK, which via a branch 24 zeroizes a ring counter CJ stepped by the clock pulses. This ring counter is of a conventional type which automatically enters in its first stage the complement of the bit appearing in its last stage. Counter CJ divides each bit phase into as many subperiods as are frames to be scanned by each input memory of unit RC, i.e. 32 in the present instance. The codes for these subperiods appear on an output multiple 27 and have been partly indicated at the top of FIG. 7. Multiple 27 extends to a decoder CD which also receives the output of a synchronous binary counter CB stepped by an output lead 28 of a shift register RS3 operating as a numerical delay line under the control of clock pulses CK, this register being also reset by monoflop MN1 via lead 25 in response to synchronizing pulse S. The output multiple 29 of counter CB emits the phase-counting and channel-counting pulses TB and TC. The decoder CD produces the signals W, X, Y, MC and U1.

The reading of the memories of unit IU during a time slot may take place, for example, in the following sequence: sections $f'_{1,1}, f'_{2,1}, \ldots f'_{n,1}$ of memories IU1, IU2, ... IUn; sections $f'_{1,2}, f'_{2,2}, \ldots f'_{n,2}$ of these memories, and so on through sections $f'_{1,32}, f'_{2,32}, \ldots f'_{n,32}$. Only homologous stages of these sections are read in any phase of the time slot.

Let us consider, by way of example, a connection established between a calling subscriber, operating on a channel assigned to time slot TC4 of frame $f_{1,1}$ in receiving group $g_1$, and a called subscriber whose channel corresponds to a time slot TC7 of frame $f'_{1,32}$ in transmitting group $g'_1$. During phase TB0 (FIG. 7) of time slot TC4, submemory M1 receives the first bit of a word coming in from the calling subscriber and stores it in the first stage of its first section; in phase 7 the word has been completely stored. In the reading interval of the latter phase, the eight bits thus stored are transferred to section $f_{1,1}$ of subdivision C4 of submemory M3 shown in FIG. 3. Thereafter, during time slot TC7, the contents of this section $F_{1,1}$ are read out into submemory M10 (FIG. 4), with a one-phase lead as discussed above, for subsequent transfer via multiplexer MX6 and registers RS2, RP2 to the conductor of frame $f'_{1,32}$.

Traffic in the opposite direction, from the called to the calling subscriber, takes place analogously by way of submemory M2 with interim storage of the incoming words from frame $f_{1,32}$ of group $g_1$ in submemory M6 whence they are read out in time slot C4 into submemory M7 for inclusion, via registers RS1 and RP1, in frame $f'_{1,1}$ of group $g'_1$.

It should be noted that the order of inscription of the words in the several sections of an output submemory such as M7 is that in which they are successively read out, under the control of processor EL, from any of the transit memories of FIG. 3 temporarily communicating with that submemory.

With $n = 8$, the disclosed system according to our invention can handle more than 8,000 simultaneous connections.

We claim:

1. A switching station for a pulse-code-modulation telecommunication system wherein information is exchanged between a multiplicity of incoming channels and a multiplicity of outgoing channels, each of said channels consisting of a sequence of h-bit words, the words of a predetermined number $p$ of channels being interleaved in respective time slots of $h$ phases each forming part of a recurrent frame period, comprising:
- a set of receiving signal paths divided into n groups of $m$ paths, each of said paths carrying a respective incoming frame;
- a set of transmitting signal paths divided into n groups of $m$ paths, each of the latter paths carrying a respective outgoing frame;
- a set of $n$ input memories respectively associated with said groups of receiving signal paths, each of said input memories including $m$ sections of $h$ stages each;
- a set of $n$ output memories respectively associated with said groups of transmitting signal paths, each of said output memories including $m$ sections of $h$ stages each;
- first multiplexing means between said groups of receiving signal paths and said input memories for reloading each input memory during every time slot by simultaneously transferring homologous bits from all said receiving signal paths to respective stages of corresponding sections of the associated input memories in the course of a single phase;
- second multiplexing means for sequentially transferring, during each time slot, the contents of all the sections of each input memory into respective sections of selected output memories communicating with certain of said transmitting signal paths, with simultaneous transfer of homologous bits from corresponding stages of all sections of said output memories during a single phase; and
- processor means for controlling the operation of said second multiplexing means.

2. A station as defined in claim 1, further comprising a set of $n$ transit memories inserted between said input memories and said second multiplexing means for temporarily storing the words to be transferred to said output memories.

3. A station as defined in claim 2 wherein each transit memory has $p$ subdivisions respectively allocated to the $p$ time slots of a frame period, with transfer of the contents of each input memory during each time slot to the sections of the respectively allocated subdivision of an associated transit memory in an invariable order and with consecutive readout of said $p$ subdivisions during respective time slots by said second multiplexing means under the control of said processor means.

4. A station as defined in claim 3 wherein said transit memories and said output memories are divided into submemories operative during alternate time slots.

5. A station as defined in claim 4 wherein each of said input memories is divided into halves, said transit and output memories consisting each of two pairs of submemories co-operating with respective halves of said input memories.

6. A station as defined in claim 3 wherein the number $m$ of said signal paths per group equals the number $p$ of time slots per frame period.

* * * * *